(12) United States Patent
Hyland et al.

(10) Patent No.: US 6,501,231 B1
(45) Date of Patent: Dec. 31, 2002

(54) METAL HALIDE LIGHTBULB STROBE SYSTEM

(75) Inventors: James H. Hyland, Belleair Beach, FL (US); John E. Powell, Largo, FL (US)

(73) Assignee: Amglo Kemlite Laboratories, Inc., Largo, FL (US)

( * ) Notice: Subject to any disclaimer, the term of this patent is extended or adjusted under 35 U.S.C. 154(b) by 0 days.

(21) Appl. No.: 09/901,519

(22) Filed: Jul. 9, 2001

(51) Int. Cl.$^7$ .................................................. F21S 3/00
(52) U.S. Cl. ............................... 315/241 S; 315/209 R; 313/621; 313/623
(58) Field of Search .................... 315/241 S, 241 P, 315/291, 294, 295, 360, 236, 246, 254, 204 R; 313/621, 637–642, 238, 567, 623–626; 362/227; 307/10.8

(56) References Cited

U.S. PATENT DOCUMENTS

| | | | |
|---|---|---|---|
| 3,259,777 A | 7/1966 | Fridrich | 313/570 |
| 3,780,342 A | 12/1973 | Grimshaw et al. | 315/173 |
| 3,989,970 A | 11/1976 | Downing | 313/42 |
| 4,779,026 A | 10/1988 | Heider et al. | 313/631 |
| 5,270,608 A | 12/1993 | Williamson et al. | 313/25 |
| 5,291,100 A | 3/1994 | Wood | 315/136 |
| 5,604,406 A | 2/1997 | Gaus | 315/56 |
| 5,847,510 A | 12/1998 | Goelling et al. | 313/623 |
| 6,005,356 A | * 12/1999 | Horiuchi et al. | 315/176 |
| 6,022,125 A | 2/2000 | Bartasevich et al. | 362/251 |
| 6,181,065 B1 | * 1/2001 | Huettinger et al. | 313/567 |
| 6,215,254 B1 | * 4/2001 | Honda et al. | 313/623 |
| 6,376,996 B1 | * 4/2002 | Olson | 315/241 S |

* cited by examiner

Primary Examiner—Don Wong
Assistant Examiner—Ephrem Alemu
(74) Attorney, Agent, or Firm—Larson & Larson, PA; James E. Larson

(57) ABSTRACT

The system contains a quartz arc tube surrounding a gas tight envelope containing mercury, a metal halide, a rare earth gas and a pair of end to end spaced apart tungsten electrodes attached at a distal end to a molybdenum foil seal. A circuit is provided to generate an initial ignition voltage of 30,000 volts and thereafter, a circuit of 100–2,000 watts with a timer to automatically break and reconnect the circuit to provide a strobe light. A single driver actuates multiple lamps.

15 Claims, 6 Drawing Sheets

METAL HALIDE LIGHTBULB STROBE SYSTEM

FIELD OF THE INVENTION

The present invention relates to metal halide light bulbs. More particularly, it refers to a strobe light caused by a high intensity discharge metal halide lightbulb utilizing switching circuitry.

DESCRIPTION OF THE PRIOR ART

While metal halide lamps offer far greater lumens per watt than tungsten halogen lamps, bulb lifetimes are frequently shortened as applications require rapid start up and hot re-strike characteristics in higher wattage lamps. Typical prior art metal halide light bulbs are described in U.S. Pat. No. 3,259,777, wherein an iodide gas is produced by a salt of iodide such as indium triiodide. Once this type of lamp's arc discharge is disrupted, the lamp cannot be restarted without significant delay of up to one minute. U.S. Pat. No. 3,989,970 describes an improvement utilizing metal fins at the external terminals to cool the electrodes and enhance more rapid start up after arc discharge is disrupted.

In U.S. Pat. No. 3,780,342, a circuit is described for starting a high operating temperature lamp. An initial starting pulse of 8000 volts creates an arc between the electrodes. The circuit reduces the voltage to 40 volts whereupon the circuit performs a ballasting function to regulate the operating circuit. This type lamp also has a slow restart time after interruption of current in the power supply.

U.S. Pat. No. 4,779,026 describes a metal halide high discharge lamp with at least one electrode shaped to have a narrow V form with the apex of the V facing the other electrode of the lamp. This configuration provides a light output at an improved speed.

U.S. Pat. No. 5,270,608 describes a metal halide high intensity discharge lamp reducing sodium migration from an arc tube by inclusion of a shroud supported by a mechanical mounting structure.

U.S. Pat. No. 5,291,100 describes a low DC input, low wattage high intensity discharge metal halide lamp having a regulated power supply. The lamp is controlled by a switching and voltage regulation circuit with an adjustable duty cycle oscillator and driver feeding a main ballast transformer.

U.S. Pat. No. 5,604,406 describes a lamp assembly including a circuit board for creating a rapid start metal halide bulb.

None of the above high intensity discharge metal halide lamps can be used as a strobe because of a lag between stop and start up. A high intensity discharge metal halide used as a strobe would have distinct advantages over standard strobe lights currently in use, since a metal halide bulb has a longer life than a filament or halogen light bulb. Moreover, high intensity discharge metal halide bulbs produce more light power output than filament or halogen light bulbs. A need exists for a flashing high intensity discharge metal halide lamp.

SUMMARY OF THE INVENTION

This invention describes a high intensity discharge metal halide lamp that has a circuit and structure allowing for flashing similar to currently used strobe lights but with a longer life advantage and more light power output characteristic of a high intensity discharge metal halide lamp.

The lamp employed contains a quartz or fused silicon arc tube surrounding a gas tight envelope containing mercury, a metal halide, a rare earth gas and a pair of end to end spaced apart tungsten electrodes. The electrodes are attached at their distal ends to a molybdenum foil. The arc tube is hermetically sealed within a borosilicate glass envelope. The lamp receives from an electrical circuit an initial charge of at least 30,000 volts to cause ignition. Thereafter, the electrical circuit is maintained with 100–2000 watts as the circuit is automatically broken and connected continuously with a timer in the circuit. A single driver actuates multiple lamps.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
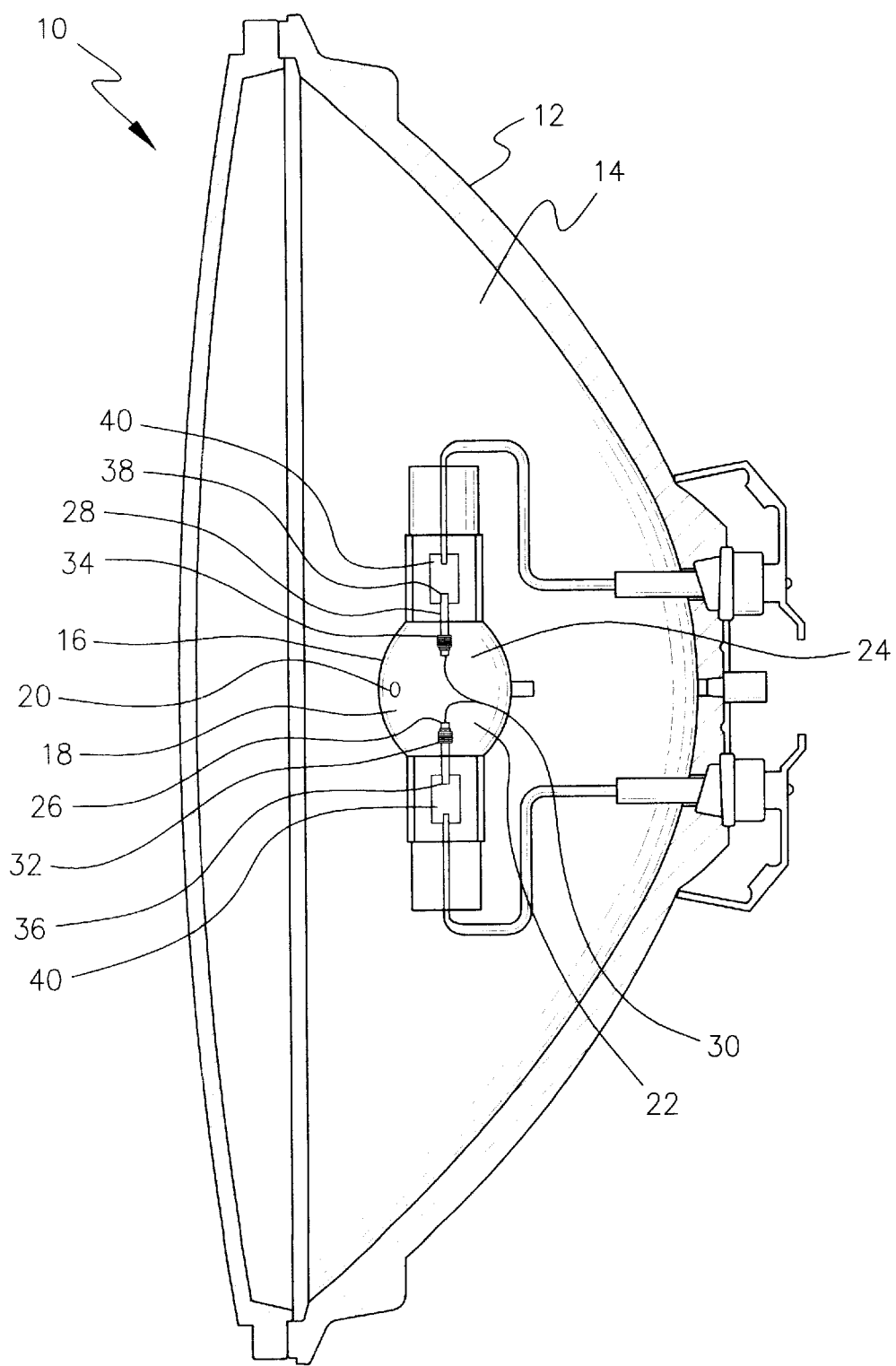
FIG. 1 is an elevational view partially in section of the lamp containing a high intensity light bulb used in the strobe system of the invention.
Figure 2:
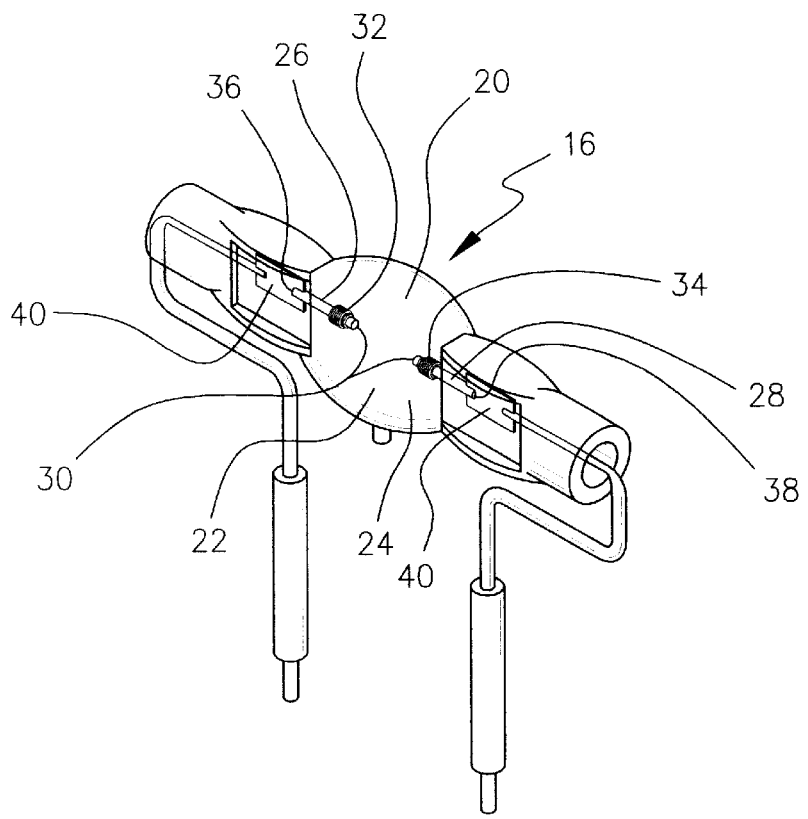
FIG. 2 is a perspective view of the metal halide high intensity light bulb used in the strobe system of the invention.
Figure 3:
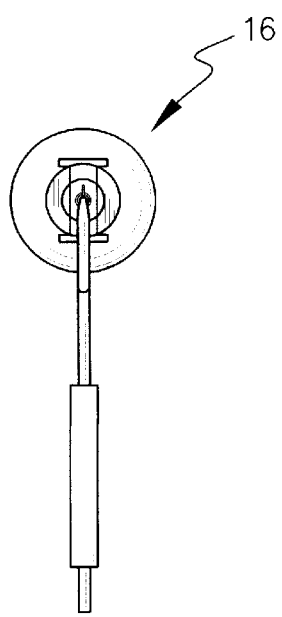
FIG. 3 is an elevational side view of the light bulb of FIG. 2.
Figure 4A:
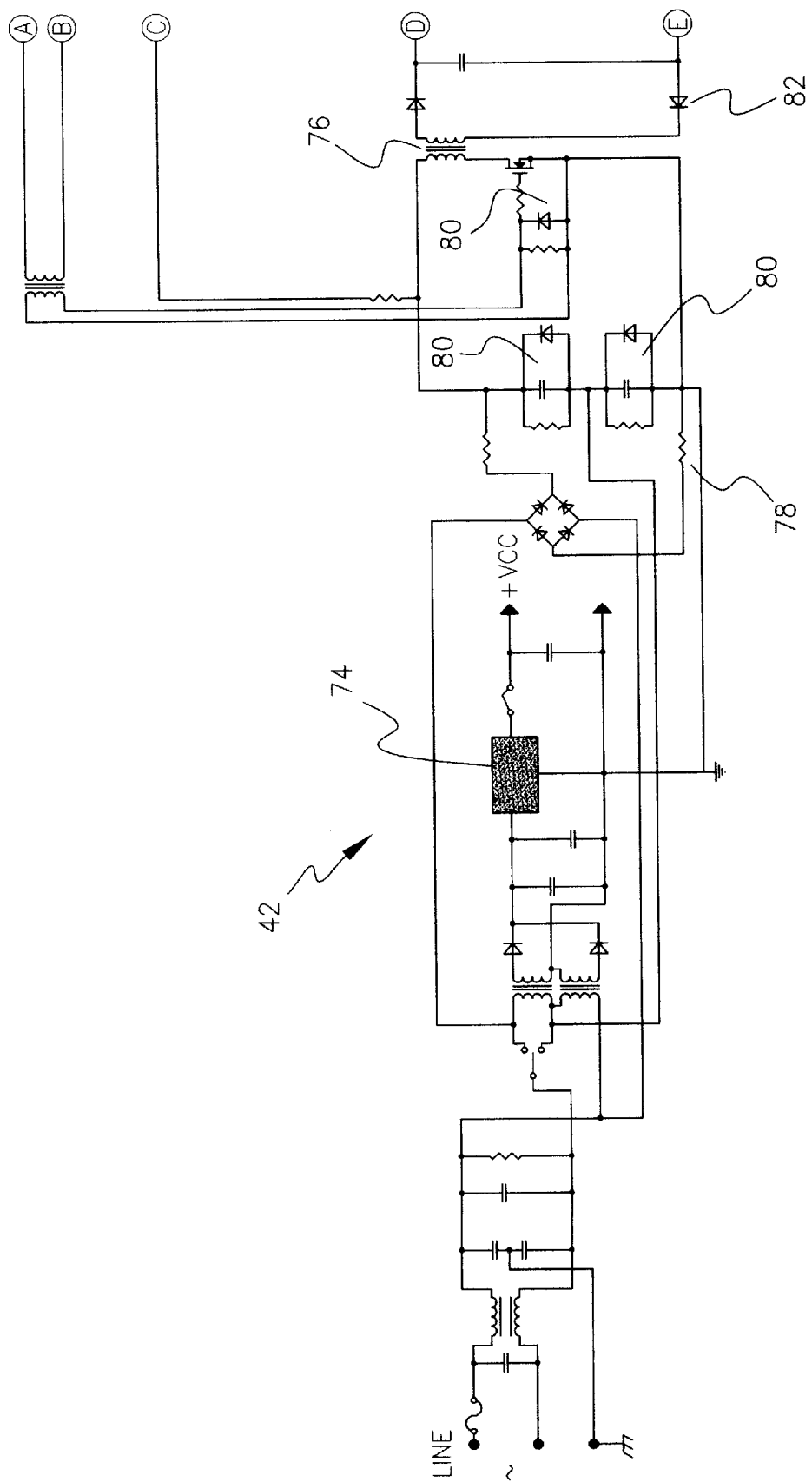
FIGS. 4A to 4D is a schematic of the circuitry used to actuate the light bulbs used in the strobe system of the invention.
Figure 4B:
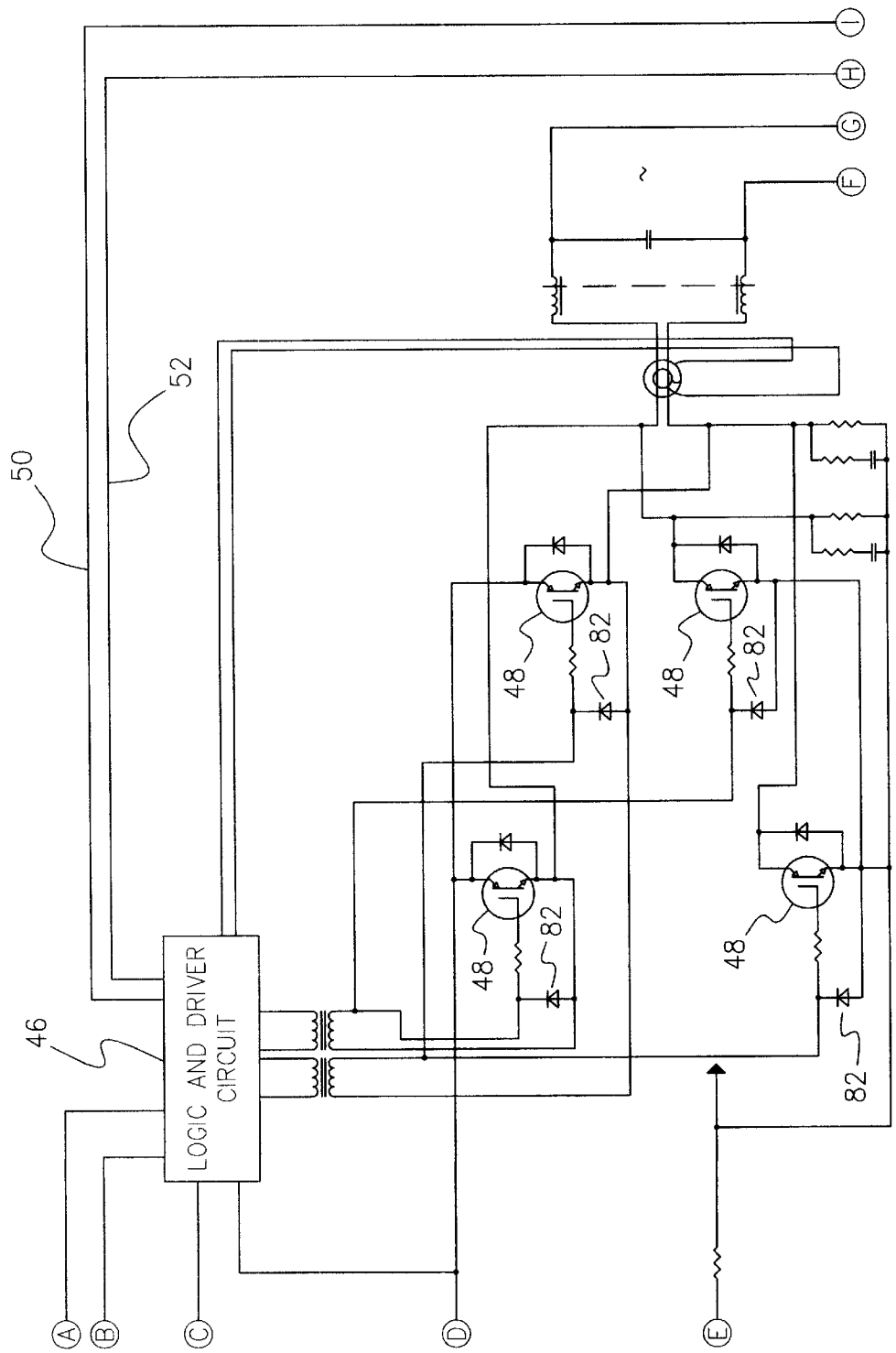
Figure 4C:
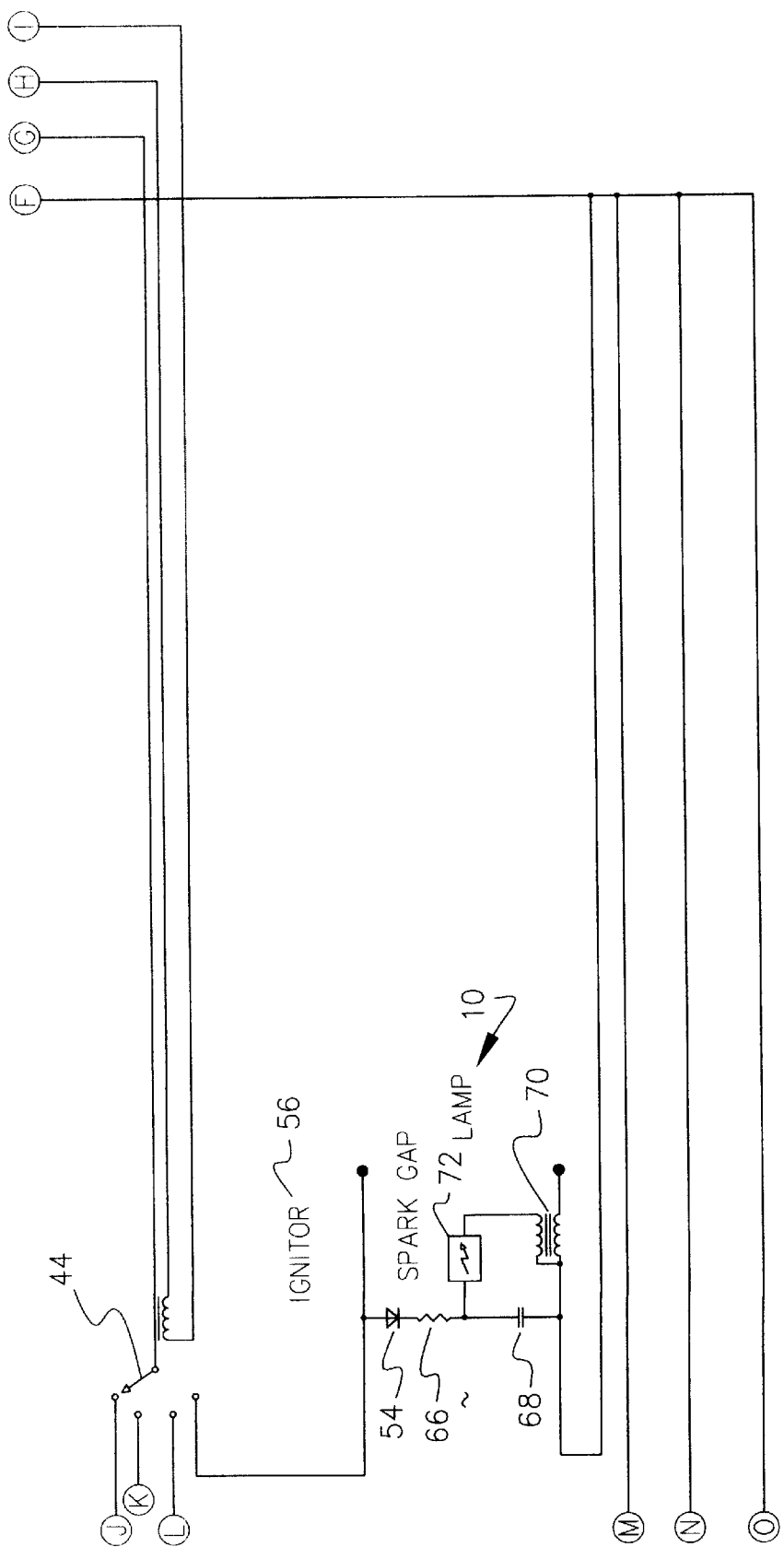
Figure 4D:
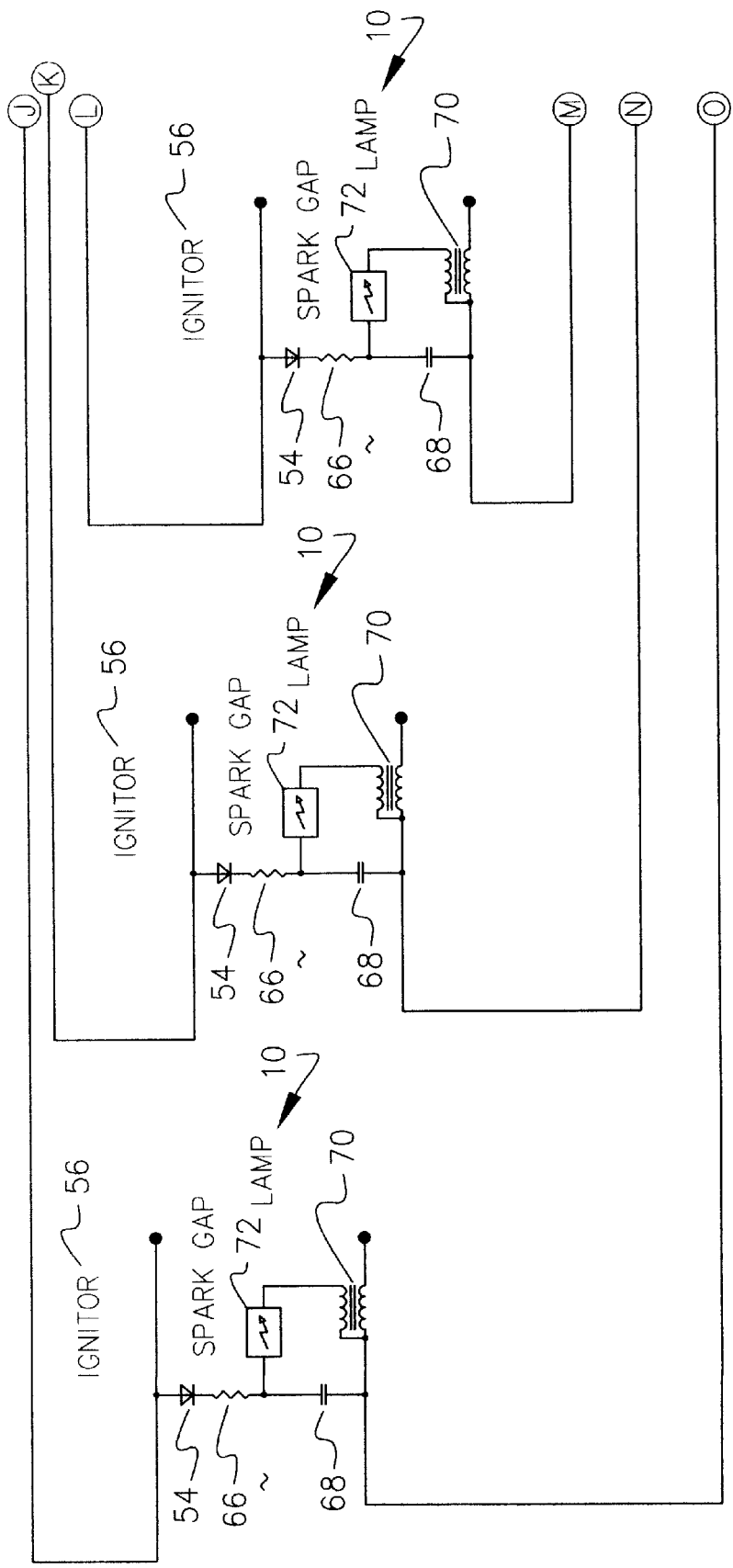

Throughout the following detailed description, the same reference numerals refer to the same elements in all figures. Referring to FIG. 1, the lamp 10 has a borosilicate glass 12 enclosing a hermetically sealed envelope 14. Within the envelope 14 is mounted a quartz or fused silica arc tube 16. The arc tube 16 contains a gas tight envelope 18 containing mercury 20, a metal halide 22 such as sodium iodide, a rare earth gas 24 such as Xenon or a nitrogen gas, and a first 26 and second 28 tungsten electrode. The electrodes contain 1–2% by weight thallium or thorium. The proximal ends 30 of each electrode 26 and 28 are spaced apart from 4 to 12 mm. It is preferred to space the electrode proximal ends 5–8 mm and particularly preferred to space the ends 5.0 to 5.5 mm apart. In addition, the electrodes require a diameter of a t least 0.002 inches and have thickened end portions 32 and 34. The preferred electrode diameter is between 0.002 and 0.005 inches. The distal ends 36 and 38 of the electrodes are each attached respectively to a molybdenum foil 40.

The circuit 42 shown in FIGS. 4A to 4D emits an ignition voltage of at least 30,000 volts through an ignitor 56. Thereafter, a switch 44 closes and opens the circuit at a prescribed number of seconds apart while the circuit wattage is provided at 100–2000 watts. The single logic and driver circuit 46 has multiple insulated gate bipolar transistors 48 and power lines 50 and 52, leading to a switch 44. The switch 44 is controlled by a timer (not shown). The circuit leading to each lamp 10 contains a diode 54, a resister 66, a capacitor 68 and a step up transformer 70 to generate about 30,000 volts. A break 72 occurs at 280 volts. Each of multiple lamps 10 are started with 30,000 volts which decreases immediately to 280 volts. Two to ten lamps 10 could be used in the system. The system makes a square wave.

The driver 46 is actuated by a standard electrical circuit system incorporating a voltage regulator 74, a transformer 76 increasing voltage to 300 volts, and a D.C. rectifier 78. Capacitors 80 and diodes 82 complete the system.

The above description has described specific structural details embodying the lamps and the electrical circuit of the invention. However, it will be within the skill of one having ordinary skill in the art to make modifications and substituting equivalents without departing from the spirit and scope of the underlying inventive concept of the system.

Having thus described the invention what is claimed is:

1. A high intensity discharge metal halide strobe emitting lamp comprising:

a quartz or fused silica arc tube surrounding a gas tight envelope containing mercury, a metal halide, a rare earth gas or nitrogen and a pair of end to end spaced apart tungsten electrodes, having a diameter of 0.002 to 0.005 inches;

the arc tube hermetically sealed within a borosilicate glass envelope;

a proximal end of each tungsten electrode spaced apart 4 to 12 mm;

a distal end of each tungsten electrode attached to a molybdenum foil seal;

the strobe emitting lamp adapted to receive an ignition charge of at least 30,000 volts at each on portion of an on and off cycle; and a wattage of 100–2000 watts during the on portion of the cycle to provide a strobe emitting light.

2. The high intensity discharge metal halide strobe emitting lamp according to claim 1 wherein the metal halide is sodium iodide.

3. The high intensity discharge metal halide strobe emitting lamp according to claim 1 wherein the rare earth gas is Xenon.

4. The high intensity discharge metal halide strobe emitting lamp according to claim 1 wherein the tungsten electrode proximal ends are spaced apart 5.0 to 8.0 mm.

5. The high intensity discharge metal halide strobe emitting lamp according to claim 1 wherein the tungsten electrode proximal ends are spaced apart 5.0 to 5.5 mm.

6. The high intensity discharge metal halide strobe emitting lamp according to claim 1 wherein the pair of tungsten electrodes contain 1–2% thallium or thorium.

7. A method for generating a strobe emitting light comprising:

(a) providing a quartz or fused silica arc tube surrounding a gas tight envelope containing mercury, a metal halide, a rare earth gas or nitrogen and a pair of end to end spaced apart tungsten electrodes;

(b) hermetically sealing the arc tube within a borosilicate glass envelope;

(c) attaching a distal end of each of the pair of tungsten electrodes to a molybdenum foil seal;

(d) providing an electrical circuit with an on and off continuous cycle, the circuit generating an ignition charge of at least 30,000 volts each time the circuit turns on; and (e) continuing with an on and off break in the circuit employing a wattage of 100–2,000 watts when the circuit is on to provide a strobe emitting light.

8. The method according to claim 7 wherein the metal halide provided in the arc tube is sodium iodide.

9. The method according to claim 7 wherein the rare earth gas provided in the arc tube is Xenon.

10. The method according to claim 7 wherein the spaced apart distance provided between the pair of end to end tungsten electrodes is 4 to 12 mm.

11. The method according to claim 7 wherein the spaced apart distance provided between the pair of end to end tungsten electrodes is 5–8 mm.

12. The method according to claim 7 wherein the spaced apart distance provided between the pair of end to end tungsten electrodes is 5.0 to 5.5 mm.

13. A method for generating a strobe emitting light from multiple high intensity metal halide lamps comprising:

(a) providing each of the multiple lamps in a quartz arc tube surrounding a gas tight envelope containing mercury, a metal halide, a rare earth gas and a pair of proximal end to end spaced apart tungsten electrodes;

(b) attaching a distal end of each of the pair of tungsten electrodes to a molybdenum foil seal;

(c) providing an electrical circuit to generate an ignition with at least 30,000 volts each time the circuit turns on;

(d) providing a driver to actuate the multiple lamps; and (e) providing an available wattage of 100–2,000 watts each time the circuit turns on.

14. The system according to claim 13 wherein the metal halide is sodium iodide and the rare earth gas is Xenon provided in the quartz arc tube.

15. The system according to claim 13 wherein the driver actuates four lamps at different times as controlled by a timer.

\* \* \* \* \*